United States Patent
Gordon et al.

(10) Patent No.: US 10,366,129 B2
(45) Date of Patent: Jul. 30, 2019

(54) DATA SECURITY THREAT CONTROL MONITORING SYSTEM

(71) Applicant: Bank of America Corporation, Charlotte, NC (US)

(72) Inventors: Candace R. Gordon, Jacksonville, FL (US); Alys Lisella, Jacksonville, FL (US); Iptisha Raote, Charlotte, NC (US); Haresh Kurani, Charlotte, NC (US); Parash Sharma, Moorpark, CA (US); Steven K. Bickmore, Evergreen, CO (US); Ravi Kiran Sonthi, Jacksonville, FL (US); Lauren Fields Doran, Jacksonville, FL (US); Deborah J. Bessent, Fleming Island, FL (US)

(73) Assignee: Bank of America Corporation, Charlotte, NC (US)

( * ) Notice: Subject to any disclaimer, the term of this patent is extended or adjusted under 35 U.S.C. 154(b) by 309 days.

(21) Appl. No.: 14/959,296

(22) Filed: Dec. 4, 2015

(65) Prior Publication Data

US 2017/0163677 A1   Jun. 8, 2017

(51) Int. Cl.
*G06F 11/00* (2006.01)
*G06F 12/14* (2006.01)
(Continued)

(52) U.S. Cl.
CPC ...... *G06F 16/9535* (2019.01); *G06F 16/2365* (2019.01); *G06F 16/24578* (2019.01); *H04L 63/1408* (2013.01)

(58) Field of Classification Search
CPC ......... G06F 17/30867; G06F 17/30371; G06F 17/3053; G06F 16/9535; G06F 16/2365;
(Continued)

(56) References Cited

U.S. PATENT DOCUMENTS

| 7,028,018 B2 | 4/2006 | Kocher |
| 7,114,183 B1 | 9/2006 | Joiner |

(Continued)

OTHER PUBLICATIONS

"Zyzzyva: Speculative Byzantine Fault Tolerance," Ramakrishna Kotla et al., Microsoft Research, ACM Transactions on Computer Systems (vol. 27, No. 4, Article 7), Dec. 2009.
(Continued)

*Primary Examiner* — Trong H Nguyen
*Assistant Examiner* — Amie C. Lin
(74) *Attorney, Agent, or Firm* — Banner & Witcoff, Ltd.; Michael A. Springs

(57) ABSTRACT

A data security threat control and monitoring system and method described herein may provide visibility into users' activities and their access to sensitive information (e.g., social security number, addresses, fingerprints, and the like) in order to evaluate and mitigate, for example, insider data security threats. The system may monitor various types of activities, such as end users' behavior on applications and/or end users' access, downloads, and copies of sensitive data. The system may monitor for suspected or detected violations and incidents for applications, such as suspicious, disruptive, or policy-violating (actual or attempted) activities. A distributed file system may be used to extract data from one or more databases and to transform the data. The data may be processed, such as to generate distribution fact and dimension files. Servers, such as web servers, may generate reports indicating insider threat activity using the processed files. Exemplary benefits of the system described herein include savings in processing (e.g., CPU) speed and performance and savings in data storage.

20 Claims, 10 Drawing Sheets

(51) Int. Cl.
*G06F 12/16* (2006.01)
*G08B 23/00* (2006.01)
*G06F 16/9535* (2019.01)
*G06F 16/23* (2019.01)
*G06F 16/2457* (2019.01)
*H04L 29/06* (2006.01)

(58) Field of Classification Search
CPC .......... G06F 16/24578; H04L 63/1408; H04L 63/14; H04L 63/1416; H04L 63/1425; H04L 63/1441
See application file for complete search history.

(56) References Cited

U.S. PATENT DOCUMENTS

| | | | |
|---|---|---|---|
| 7,418,733 | B2 | 8/2008 | Connary et al. |
| 8,056,130 | B1 | 11/2011 | Njemanze et al. |
| 8,375,452 | B2 | 2/2013 | Raviv |
| 8,631,457 | B1 | 1/2014 | Schepis et al. |
| 8,707,431 | B2 | 4/2014 | Stephens et al. |
| 8,769,684 | B2 | 7/2014 | Stolfo et al. |
| 8,775,613 | B2 | 7/2014 | Chang et al. |
| 8,819,825 | B2 | 8/2014 | Keromytis et al. |
| 8,868,728 | B2 | 10/2014 | Margolies et al. |
| 8,965,823 | B2 | 2/2015 | Sohn et al. |
| 2003/0084349 | A1* | 5/2003 | Friedrichs ............... G06F 21/55 726/22 |
| 2005/0050334 | A1 | 3/2005 | Liang et al. |
| 2005/0188423 | A1 | 8/2005 | Motsinger et al. |
| 2007/0204345 | A1 | 8/2007 | Pereira et al. |
| 2009/0241188 | A1 | 9/2009 | Komura |
| 2009/0281864 | A1 | 11/2009 | Abercrombie et al. |
| 2009/0328209 | A1* | 12/2009 | Nachenberg ........... G06Q 10/10 726/22 |
| 2010/0064039 | A9 | 3/2010 | Ginter et al. |
| 2011/0289588 | A1 | 11/2011 | Sahai et al. |
| 2012/0257626 | A1* | 10/2012 | McGhee ............. H04L 45/7453 370/392 |
| 2014/0181890 | A1* | 6/2014 | Hoyos .................. H04L 63/107 726/1 |
| 2014/0279641 | A1 | 9/2014 | Singh et al. |
| 2015/0161671 | A1* | 6/2015 | Watkeys ............ G06Q 30/0269 705/14.66 |
| 2016/0164893 | A1* | 6/2016 | Levi .................... H04L 63/1416 726/23 |
| 2017/0011088 | A1* | 1/2017 | Muehlich ............ G06F 17/3033 |

OTHER PUBLICATIONS

"Data Storage, IT Maintenance, Backup & Recovery, Cloud, Switches," MSDI, retrieved Sep. 25, 2015 from <http://www.msdi.com/>.

"The Syncsort DMExpress: SQL Migration Solution," Sycnsort Incorporated, 2012.

"On the Design of a Big Data based Real-Time Network Traffic Analysis Platform," Donghwan Lee et al., Journal of The Korea Institute of Information Security & Cryptology (vol. 23, No. 4), Aug. 2013.

"Semantic Computing and Business Intelligence," Jennifer Kim et al., International Journal of Semantic Computing (vol. 7, No. 1), 2013.

"Meet Syncsort DMX: A Smarter Approach to Data Integration!," Syncsort, retrieved Sep. 22, 2015 from <http://www.syncsort.com/en?Products/BigData/DMX>.

"Teradata database 15.10: High-Performace Analytics for Today's Business," Teradata Corporation, 2015.

"Teradata Solution Technical Overview," Teradata Corporation, 2015.

"What is Apache Hadoop?," The Apache Software Foundation, 2014, retrieved from <https://hadoop.apache.org/>.

"Distrubted file system (DFS) definition," Margaret Rouse, TechTarget, retrieved Sep. 25, 2015 from <http://searchwindowserver.techtarget.com/definition/distrubted-file-system-DFS>.

"ETL—Extract, Transform, Load," Vangie Beal, Webopedia, retrieved Sep. 29, 2015 from <http://www.webopedia.com/TERM/E/ETL.html>.

* cited by examiner

900

| | | 905 |
|---|---|---|
| From: | Security Group | |
| Sent: | MM-DD-YYYY    HH:MM PM | |
| To: | Manager 1; Manager 2 | |
| Subject: | ACTION REQUIRED: Acknowledgement \| Security Event # | |

Action Required: Acknowledgement within X Business Days     910

*Verification Letter*

To: Manager 1
CC: Manager 2

Security Group has detected <First Name> <Last Name> accessing Confidential or Proprietary information within the <Application> environment. The <Application> environment is an enterprise data warehouse containing customer-centric data, including sensitive customer information, that can be accessed by approved users to support business analytics. Unauthorized access violates Security Policy.

User: ZZZ1
Date Accessed: DD-MM-YYYY HH:MM:SS UTC     915

Please click this link to view more details.

---

*Action Required*     925

Managers: For associates who are out of the office and unable to respond, please click here to provide a return date. Note: Access will be suppressed in the interim. A reminder alert will be generated upon the return date.

Manager 1 must respond to this notification by clicking one of the responses below.     930

Please choose ONE appropriate link below WITHIN THREE DAYS of email receipt:
1. Normal Business Activity: I have confirmed the user is performing a normal, authorized business activity for an open ended amount of time.
2. Temporary Business Need: I have confirmed the user is performing a temporary, authorized business activity that will be discontinued at a future date.
3. Revoke Access: I have confirmed the user does not require access to the <Application>.

| Person Number | Employee First Name | Employee Last Name | Associate ID | Application Number | Application Name | Network Login ID | IP Address | Machine Name | SSN |
|---|---|---|---|---|---|---|---|---|---|
| ZZZ1 | First Name | Last Name | AAA1 | BBB1 | CCC1 | DDD1 | EE.FFF.GG.HHH | III1 | 0 |

1010

| CCN | Debit Card Numbers | Mortgage Loan Numbers | HELOC Numbers | CD Numbers | Insurance Policy Numbers | Other Accounts | First Name | Last Name | Address Line 1 | Address Line 2 | City | State |
|---|---|---|---|---|---|---|---|---|---|---|---|---|
| PIN-Passwords | | | | | | | | | | | | |
| 0 | 0 | 0 | 0 | 0 | 0 | 0 | 0 | 0 | 0 | 0 | 0 | 0 |

1015

| Zip | Email | Phone | Challenge Response for Forgotten Password | SQL Lookup Status | Sum of Type 2 | Query ID | Data Source Type | Environment | Calendar Date | Event Date Time Accessed | Type 1 Count |
|---|---|---|---|---|---|---|---|---|---|---|---|
| 0 | 0 | 0 | 0 | Above | 2,191 | JJJJ1 | RDBMS | KKKKK1 | MM-DD-YYYY HH:MM:SS PM | MM-DD-YYYY HH:MM:SS PM | 1 |

DATA SECURITY THREAT CONTROL MONITORING SYSTEM

TECHNICAL FIELD

One or more aspects of the disclosure generally relate to computing devices, computing systems, and computer software. In particular, one or more aspects of the disclosure generally relate to computing devices, computing systems, and computer software that may be used to monitor and address data security threats, such as computer software and hardware threats.

BACKGROUND

Servers and databases often store sensitive data, such as employee information, company information, and the like. Many individuals (e.g., employees of the company) might have access to the sensitive data, increasing the threat of the data being compromised. What is needed is a way to monitor and mitigate any data security threats associated with sensitive data and other computer-based activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A data security threat control and monitoring system and method described herein may provide visibility into users' activities and their access to sensitive information (e.g., social security number, addresses, fingerprints, and the like) in order to evaluate and mitigate, for example, insider data security threats. The system may monitor various types of activities, such as end users' behavior on applications and/or end users' access, downloads, and copies of sensitive data. The system may monitor for suspected or detected violations and incidents for applications, such as suspicious, disruptive, or policy-violating (actual or attempted) activities. A distributed file system may be used to extract data from one or more databases and to transform the data. The data may be processed, such as to generate distribution fact and dimension files. Servers, such as web servers, may generate reports indicating insider threat activity using the processed files. Exemplary benefits of the system described herein include savings in processing (e.g., CPU) speed and performance and savings in data storage.

Some aspects as disclosed herein are directed to, for example, a system and method of receiving, at a distributed file device and from a database server, a plurality of data indicating user device activity. The plurality of data may include user identifiers identifying users associated with the user device activity. The distributed file device may receive, from a user directory, a plurality of data indicating relationships between the users associated with the user device activity. The distributed file device may generate a plurality of correlated data files based on the received plurality of data indicating user device activity and the received plurality of data indicating relationships between the users. The plurality of correlated data files may comprise a first data file that correlates a first user identifier with user device activity of a second user. The method may comprise determining a data security score for the first data file, and in response to determining that the data security score for the first data file exceeds a threshold score, transmitting at least one of the first data file or an electronic notification of the first data file to a web server. The web server may be configured to provide access to the first data file to a first user having the first user identifier.

The method may comprise generating a hash for each of the plurality of data indicating user device activity. Based on a comparison of each hash, the method may comprise determining whether duplicates of the plurality of data indicating user device activity exist. If one or more duplicates exist, the one or more duplicates may be deleted.

In some aspects, the plurality of data indicating user device activity may comprise third data indicating user device activity having a third user identifier, a third activity identifier, and a third time of activity and fourth data indicating user device activity having a fourth user identifier, a fourth activity identifier, and a fourth time of activity. The method may comprise a determination that the third user identifier matches the fourth user identifier, the third activity identifier matches the fourth activity identifier, and the third time of activity matches the fourth time of activity. Responsive to the determination, it may be determined that the fourth data indicating user device activity is a duplicate of the third data indicating user device activity. Responsive to determining that the fourth data indicating user device activity is a duplicate of the third data indicating user device activity, the fourth data indicating user device activity may be deleted.

The plurality of data indicating user device activity may comprise third data indicating user device activity and fourth data indicating user device activity. The method may further comprise generating a hash for the third data indicating user device activity to generate hashed third data. The method may also comprise generating a hash for the fourth data indicating user device activity to generate hashed fourth data. Responsive to a determination that the hashed third data matches the hashed fourth data, the system may determine that the fourth data indicating user device activity is a duplicate of the third data indicating user device activity, and responsive to determining that the fourth data indicating user device activity is a duplicate of the third data indicating user device activity, the fourth data indicating user device activity may be deleted.

In some aspects, the plurality of data indicating user device activity may comprise user logs indicating access to one or more of non-public proprietary information data, personally identifiable data, or confidential information. In some aspects, the distributed file device may provide the web server with access to the first data file, and/or the distributed file device may transmit the first data file to the database server, and the database server may be configured to provide the web server with access to the first data file. In some embodiments, the distributed file device may transmit the first data file to a policy server, and the policy server may be configured to determine the data security score for the first data file in response to receiving the first data file.

BRIEF DESCRIPTION OF THE DRAWINGS

The present disclosure is illustrated by way of example and not limited in the accompanying figures in which like reference numerals indicate similar elements and in which:

FIG. 9 illustrates an example of a notification for addressing data security threats in which various aspects of the disclosure may be implemented.

FIG. 10 illustrates examples of reports for addressing data security threats in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

As a brief introduction, a data security threat control and monitoring system and method described herein may provide visibility into users' (e.g., employees, contractors, and other individuals) activities and their access to sensitive information for evaluation and mitigation of insider threat activity. Examples of sensitive information include, but are not limited to credit card information, social security numbers, and phone numbers, among other information that will be described in further detail below. Various types of activities may be monitored and will be briefly described here (and described in further detail below). For example, the system may monitor end users' behavior on applications and/or end users' access, downloads, and copies of company information. The system may also monitor for suspected or detected violations and incidents for applications, such as suspicious, disruptive, or policy-violating (actual or attempted) activity is detected at the application level. Triggers may be used to flag users' activities as security incidents.

In some aspects, a distributed file system, such as Hadoop Distributed File System (HDFS), may be used to extract data from one or more databases and to transform the data. The data may be processed, such as to generate distribution fact and dimension files. Servers, such as web servers, may generate reports indicating insider threat activity using the processed files, as will be described in further detail below.

Exemplary benefits of the system described herein include cost savings in processing (e.g., CPU) speed and performance and cost savings in data storage. Parallel processing may be used to enhance performance. Moreover, the computing devices described herein may be pluggable and integrated with many other devices or applications.

Figure 1:
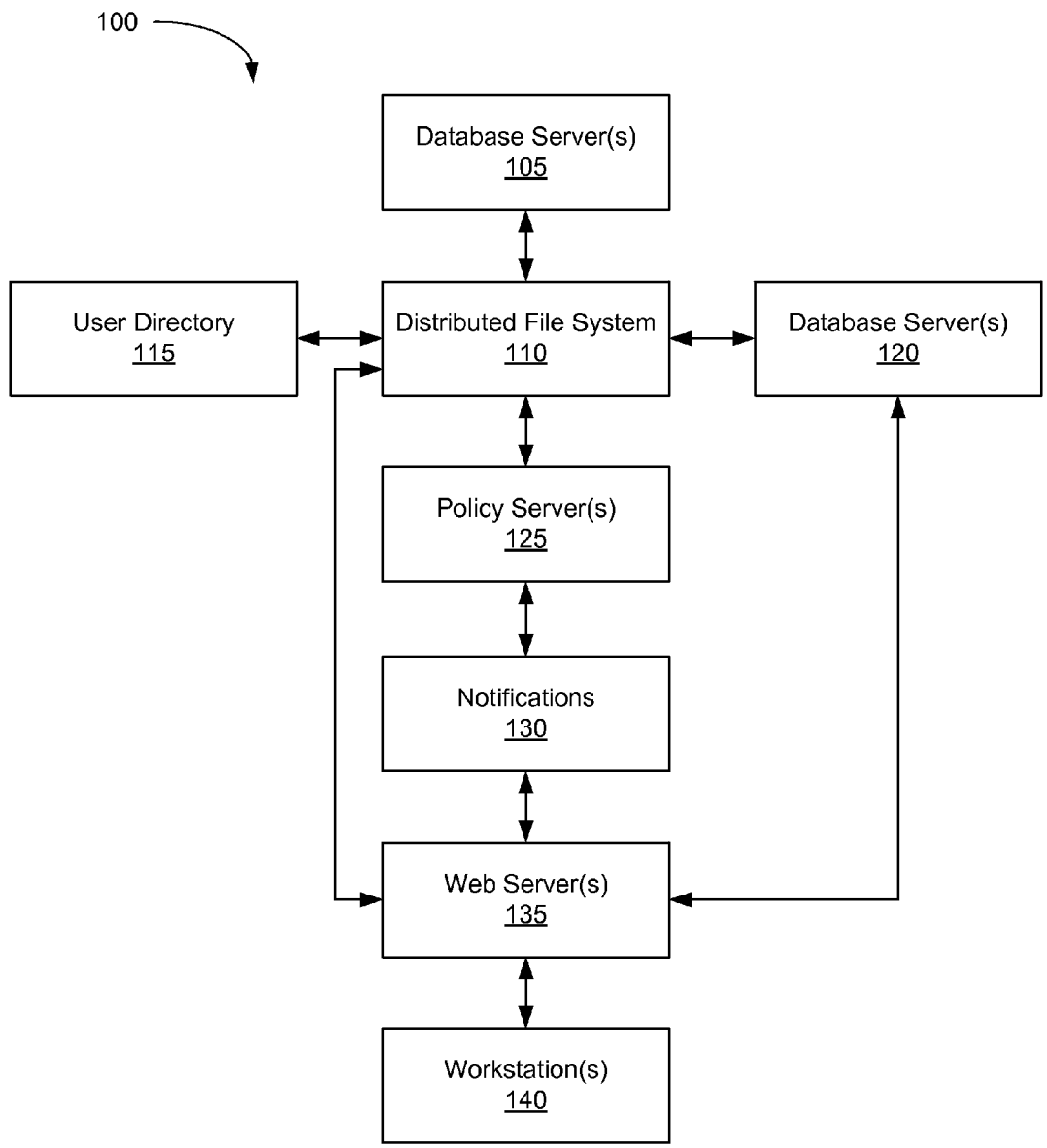
FIG. 1 illustrates an example system and network of devices in which various aspects of the disclosure may be implemented.

FIG. 1 illustrates an example system and network of devices 100 in which various aspects of the disclosure may be implemented. The network of devices 100 may comprise Database Server(s) 105. The database server(s) 105 may comprise a single server or multiple servers or server environments (e.g., regions), such as seven server environments. The data stored in the database servers 105 may comprise user activity data, such as which data or applications a user accessed, which data the user viewed or downloaded, which data the user uploaded, or other types of potentially suspicious activity, as will be described in further detail below.

The network of devices 100 may comprise Distributed File System 110. The distributed file system 110 may have a processor for controlling overall operation of the system and its associated components, including for example random access memory (RAM), read-only memory (ROM), and memory. The memory may include one or more specialized hardware and/or software modules for enabling the distributed file system 110 to perform various functions, as will be described in further detail below. The distributed filing system 110 may operate in a networked environment 100 supporting wired or wireless connections to one or more other devices, such as the database server(s) 105, one or more user directory 115, database server(s) 120, policy server(s) 125, web server(s) 135, and/or workstation(s) 140. The network connections include a local area network (LAN) and a wide area network (WAN), but may also include other networks. When used in a LAN networking environment, the distributed file system 110 may be connected to a LAN through a network interface or adapter. When used in a WAN networking environment, the distributed file system 110 may include a modem or other network interface for establishing communications over the WAN. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

The distributed file system 110 may comprise modules for performing various steps and interacting with other devices. These steps and interactions will be briefly described here, with further details in the sections below. For example, the system 110 may extract (or otherwise receive, such as load) data from the database server(s) 105. The system 110 may transform the data extracted from the database server(s) 105 and/or remove duplicate records if they exist. The system 110 may comprise a module for generating a hash for each of the non-duplicative records. The distributed filing system 110 may also determine a threat or risk score associated with each record and determine whether there is any suspicious activity based on the determined risk score for each record.

The distributed filing system 110 may also extract data from the user directory 115 and/or transform the data extracted from the user directory 115. The system 110 may comprise a module that correlates the data extracted from the database server(s) 105 (e.g., the user access data, such as activity logs) to the data extracted from the user directory 115 (e.g., the user relationship data) and to generate fact files based on the correlated data. The system 110 may also push data to one or more policy server(s) 125. The distributed filing system 110 may provide user(s) (e.g., managers or other recipients of notifications) access to the data (e.g., to one or more reports).

The network of devices 100 may comprise a plurality of edge nodes, such as one or more server clusters. The edge nodes may be part of the distributed file system 110 or may comprise a separate group of devices. In some aspects, the edge nodes may be configured as a single virtual server that processes and/or stores data. The edge nodes may push data to commodities servers. In some aspects, drivers (e.g., SQL server drivers) may be installed on the edge nodes. The drivers may be used to populate data to the policy server 125 using, for example, a push mechanism. Another driver installed on the edge node servers may be used to read data from the user directory 115. The edge nodes may also run one or more shell scripts for jobs to be performed by the system. A system scheduler may be configured to manage the order and timing of the shell scripts. For example, inside each shell script, the file having the environment variables may be invoked to set the same, and the appropriate function may be called for doing specific processing. Pre-processing and post processing conditions and code is also provided inside the shell script. The edge nodes may be configured for an error handling process. For example, a separate properties file may maintained, which has a complete list of error codes and the appropriate error messages. In the shell scripts (e.g., before and after running a job), there may be a set of pre-processing and post-processing respectively done for the job. In case any of the conditions fails in either of pre and post processing checks, an appropriate error message may be displayed and the program may exit.

The network of devices 100 may comprise User Directory 115. The user directory 115 may indicate relationships between employees, managers, and other individuals within an organization (or even outside the organization, such as contractors). The user directory 115 data may be used to determine who to notify in the event of a potential data security issue.

The network of devices 100 may comprise Database Server(s) 120. The database servers 120 may be the same as the database servers 105 or may be different database servers. The data stored in the database servers 120 by the distributed filing system 110 may comprise data to be reported to various users. In some aspects, the database servers 120 may provide an alternative source from the distributed filing system 110 for accessing the data, such as by providing the data in a different format or using a different type of application.

The network of devices 100 may comprise Policy Server(s) 125. The policy server 125 may have a processor for controlling overall operation of the server(s) and its associated components, including for example random access memory (RAM), read-only memory (ROM), and memory. The memory may include one or more specialized hardware and/or software modules for enabling the policy server 125 to perform various functions, as will be described in further detail below. The policy server 125 may operate in a networked environment 100 supporting wired or wireless connections to one or more other devices. The network connections include a local area network (LAN) and a wide area network (WAN), but may also include other networks. When used in a LAN networking environment, the policy server 125 may be connected to a LAN through a network interface or adapter. When used in a WAN networking environment, the policy server 125 may include a modem or other network interface for establishing communications over the WAN. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

The policy server 125 may comprise various modules for performing various steps and interacting with other devices. These steps and interactions will be briefly described here, with further details in the sections below. For example, the policy server 125 may receive data pushed to it by the distributed filing system 110, and the policy server 125 may determine a risk score associated with each record. The policy server 125 may determine whether there is any suspicious activity based on the determined risk score for each record.

The network of devices 100 may comprise Web Server(s) 135. The web server 135 may have a processor for controlling overall operation of the server and its associated components, including for example random access memory (RAM), read-only memory (ROM), and memory. The memory may include one or more specialized hardware and/or software modules for enabling the web server 135 to perform various functions, as will be described in further detail below. The web server 135 may operate in a networked environment 100 supporting wired or wireless connections to one or more other devices. The network connections include a local area network (LAN) and a wide area network (WAN), but may also include other networks. When used in a LAN networking environment, the policy server 125 may be connected to a LAN through a network interface or adapter. When used in a WAN networking environment, the policy server 125 may include a modem or other network interface for establishing communications over the WAN. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

The web server 135 may comprise various modules for performing various steps and interacting with other devices. These steps and interactions will be briefly described here, with further details in the sections below. For example, the web server 135 may access the data from the distributed file system 110 and/or the database server(s) 120. The web server 135 may include modules for generating distribution files so that by one or more notified users (e.g., managers) may access user activity data. The web server 135 may send notification(s) 130 to one or more user(s), such as the employee's manager(s) or a group associated with the employee or manager. The web server 135 may provide user(s) (e.g., managers or other recipients of notifications) access to the data (e.g., to one or more reports). For example, data in the distributed file system 110 and/or the database server(s) 120 may be displayable via the web server 135. For example, once a manager clicks on an embedded link in a notification email, the associate's record may be displayed through a browser on the manager's workstation.

The network of devices 100 may comprise one or more Workstation(s) 140 (or other computing device). The workstation 140 may have a processor for controlling overall operation of the workstation and its associated components, including for example random access memory (RAM), read-only memory (ROM), input/output (I/O) module, and memory. The I/O module may include, e.g., a microphone, mouse, keypad, touch screen, scanner, optical reader, and/or stylus (or other input device(s)) through which a user of the workstation may provide input, and may also include one or more of a speaker for providing audio output and a video display device for providing textual, audiovisual, and/or graphical output. In some aspects, recipients of data security notifications and/or reports may be able to access the data from the distributed filing system 110 or database servers 120 via the workstation 140.

Figure 2:
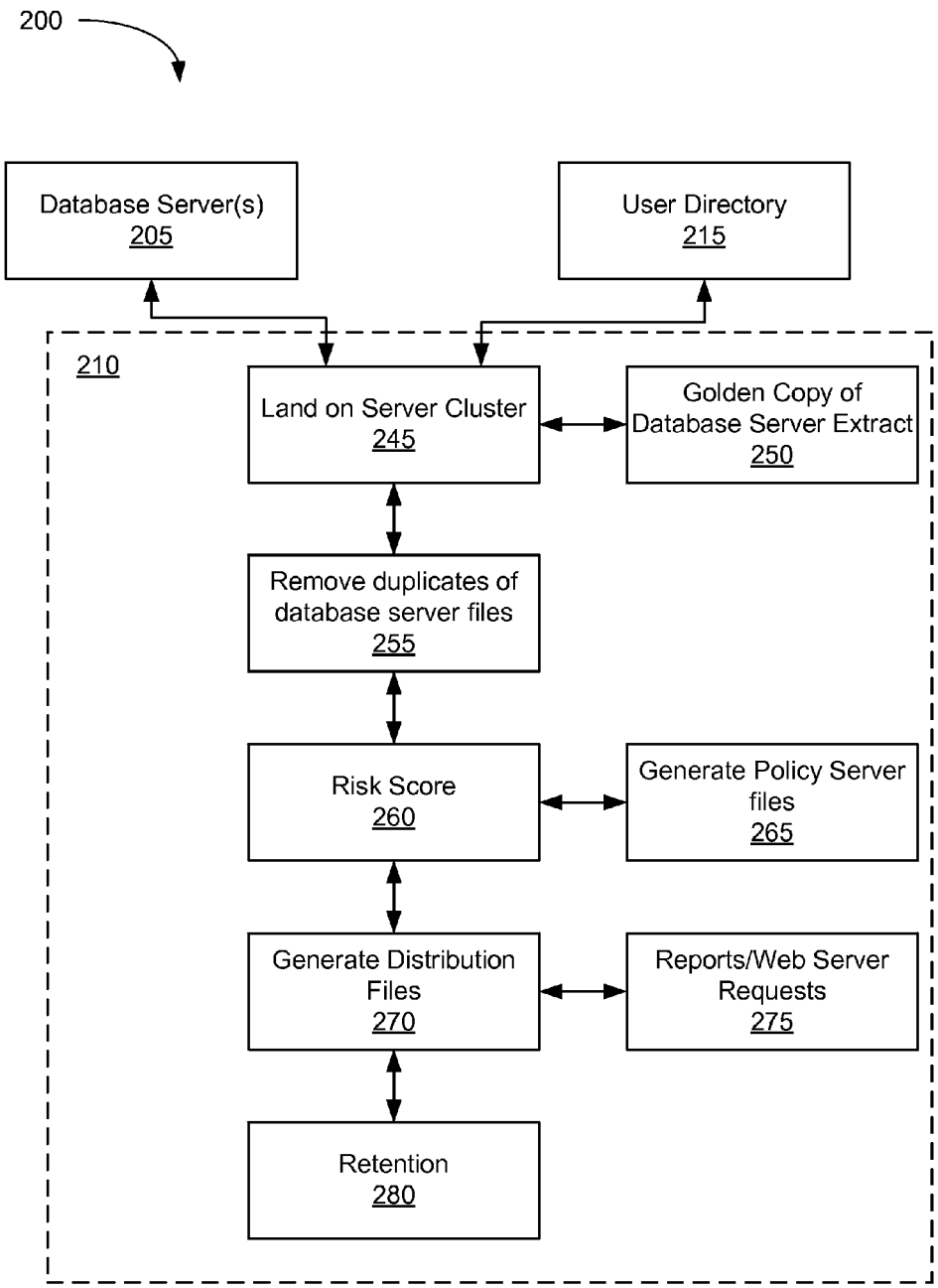
FIG. 2 illustrates another example system and network of devices in which various aspects of the disclosure may be implemented.

FIG. 2 illustrates another example system and network of devices 200 in which various aspects of the disclosure may be implemented. For example, the system 200 may comprise a database server 205, which may be the database server 105 and/or 120 previously described. The system 200 may comprise a user directory 215, which may be the user directory 115 previously described. The system 200 may comprise a distributed filing system 210, which may be the distributed filing system 110 previously described. The devices 200 illustrated in FIG. 2 may perform various steps, and those steps will now be briefly described.

In step 245, data from the database servers 205 and/or user directory 215 may land on a server or server cluster within the distributed filing system 210. The distributed filing system 210 may extract (or otherwise receive, such as load) data from the database server(s) 205. For example, the extracted data may comprise user access logs. The distributed filing system 210 may also extract data from the user directory 215. The data extracted from the user directory 115 may be transformed by the system 210.

In step 250, the distributed filing system 210 may generate an unaltered (e.g., golden copy) file prior to performing any other transformations. The transformation may be performed after the data is extracted into a single master file. Operational backups of the golden copy files may be made. Golden copies older than a predetermined age, such as seven days, may be deleted.

In step 255, the distributed filing system 210 may determine whether duplicate records exist, and the distributed filing system 210 may remove duplicate records if they exist. Duplicate records may comprise duplicates for a particular user and/or particular user activity.

In step 260, the distributed filing system 210 (and/or the policy server 125 illustrated in FIG. 1) may determine a risk score associated with each record. The distributed filing system 210 may determine whether there is any suspicious activity based on the determined risk score for each record.

In step 265, policy server files may be generated. The distributed filing system 210 may push the data to one or more policy server(s) 125, as described above with reference to FIG. 1. In step 270, the distributed filing system 210 may generate fact (e.g., distribution) files based on the correlated data (e.g., the correlation between the database server 205 data and the user director 215 data).

In step 275, the fact files may be accessed from the distributed file system 210 and/or the database server(s) 120 illustrated in FIG. 1. That is, the distributed filing system 210 may generate distribution files so that by one or more notified users (e.g., managers) may access user activity data. Notifications may be sent to one or more user(s), such as the employee's manager(s) or a group associated with the employee or manager. Those managers may be able to access the data identified in the notification from their workstations via, for example, a web server.

In step 280, the generated fact files may be stored (e.g., retained), such as in the distributed filing system 210 and/or in database server(s) 120 illustrated in FIG. 1. Other steps performed by the devices illustrated in FIG. 1 and FIG. 2 will be described in further detail below with reference to FIG. 7 and FIG. 8.

Figure 3:
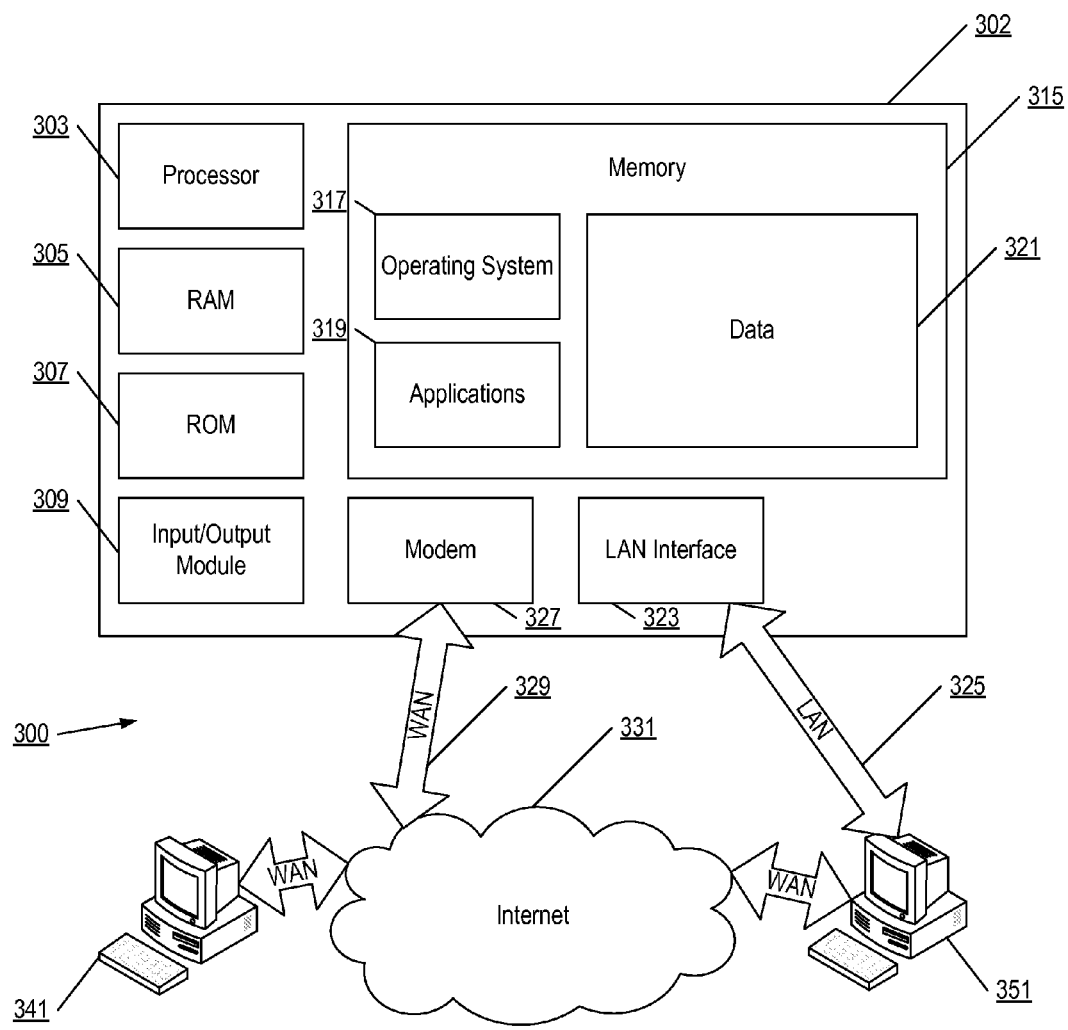
FIG. 3 illustrates an example operating environment in which various aspects of the disclosure may be implemented.

FIG. 3 illustrates an example block diagram of a computing device 301 (e.g., a computer server, desktop computer, laptop computer, tablet computer, other mobile devices, and the like) in an example computing environment 300 that may be used according to one or more illustrative embodiments of the disclosure. The computing device 301 may have a processor 303 for controlling overall operation of the server and its associated components, including for example random access memory (RAM) 305, read-only memory (ROM) 307, input/output (I/O) module 309, and memory 315.

I/O module 309 may include, e.g., a microphone, mouse, keypad, touch screen, scanner, optical reader, and/or stylus (or other input device(s)) through which a user of computing device 301 may provide input, and may also include one or more of a speaker for providing audio output and a video display device for providing textual, audiovisual, and/or graphical output. Software may be stored within memory 315 and/or other storage to provide instructions to processor 303 for enabling computing device 301 to perform various functions. For example, memory 315 may store software used by the computing device 301, such as an operating system 317, application programs 319, and an associated database 321. Additionally or alternatively, some or all of the computer executable instructions for computing device 301 may be embodied in hardware or firmware (not shown).

The computing device 301 may operate in a networked environment supporting connections to one or more remote computers, such as terminals 341 and 351. The terminals 341 and 351 may be personal computers or servers that include any or all of the elements described above with respect to the computing device 301. The network connections depicted in FIG. 3 include a local area network (LAN) 325 and a wide area network (WAN) 329, but may also include other networks. When used in a LAN networking environment, the computing device 301 may be connected to the LAN 325 through a network interface or adapter 323. When used in a WAN networking environment, the computing device 301 may include a modem 327 or other network interface for establishing communications over the WAN 329, such as the Internet 331. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 301 and/or terminals 341 or 351 may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure (including the system of FIG. 3) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
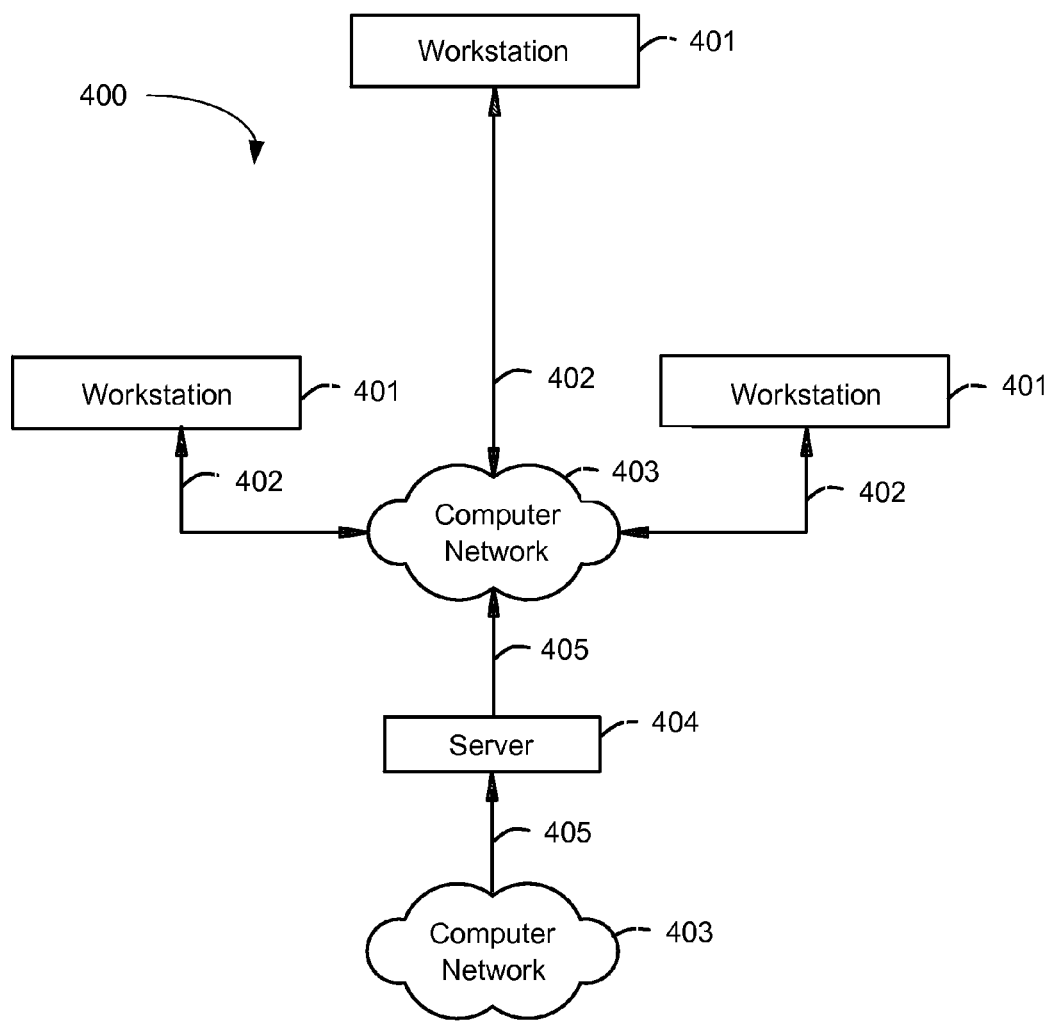
FIG. 4 illustrates another example operating environment in which various aspects of the disclosure may be implemented.

FIG. 4 illustrates another example operating environment in which various aspects of the disclosure may be implemented. An illustrative system 400 for implementing methods according to the present disclosure is shown. As illustrated, system 400 may include one or more workstations 401. The workstations 401 may be used by, for example, agents or other employees of an institution (e.g., a financial institution) and/or customers of the institution. Workstations 401 may be local or remote, and are connected by one or more communications links 402 to computer network 403 that is linked via communications links 405 to server 404. In system 400, server 404 may be any suitable server, processor, computer, or data processing device, or combination of the same.

Computer network 403 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 402 and 405 may be any communications links suitable for communicating between workstations 401 and server 404, such as network links, dial-up links, wireless links, hard-wired links, and the like.

Figure 5:
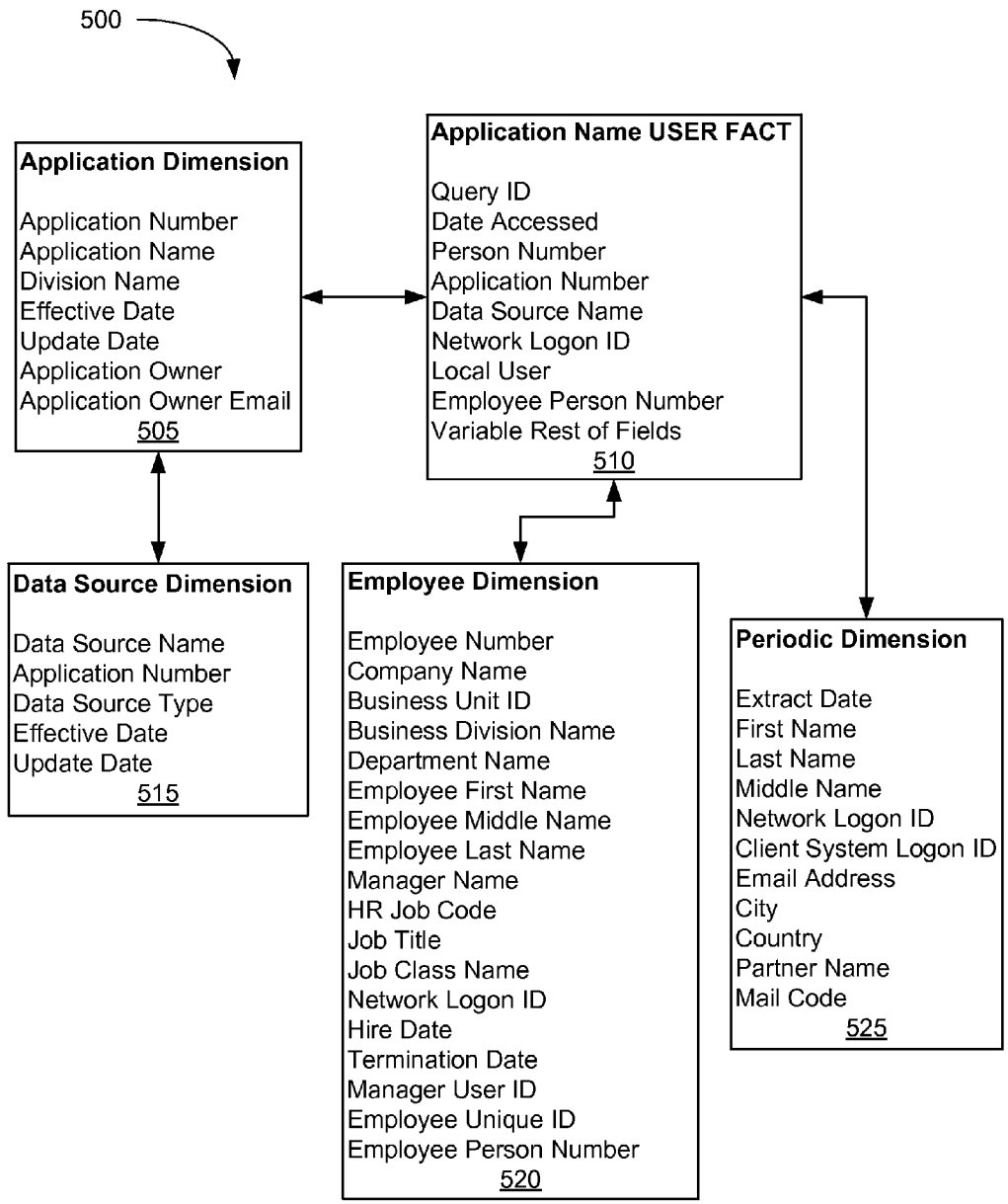
FIG. 5 illustrates an example of various data dimensions in a data security threat system in which various aspects of the disclosure may be implemented.

FIG. 5 illustrates an example of various data dimensions 500 in a data security threat system in which various aspects of the disclosure may be implemented. For example, the application dimension 505 may comprise the application number, the application name, the division name, the effective date, the update date, the application owner, and/or the application owner email. The application name user fact 510 may comprise the query ID, the date accessed, the person number, the application number, the data source name, the network logon ID, the local user, the employee person number, and/or variable other data fields. The data source dimension 515 may comprise the data source name, the application number, the data source type, the effective date, and/or the update date. The employee dimension 520 may comprise the employee number, the company name, the business unit ID, the business division name, the department name, the employee first name, the employee middle name, the employee last name, the manager name, the HR job code, the job title, the job class name, the network logon ID, the hire date, the termination date, the manager user ID, the employee unique ID, and/or the employee person number. The periodic dimension 525 may comprise the extract date, the first name, the last name, the middle name, the network logon ID, the client system logon ID, the email address, the city, the country, the partner name, and/or the mail code.

Figure 6:
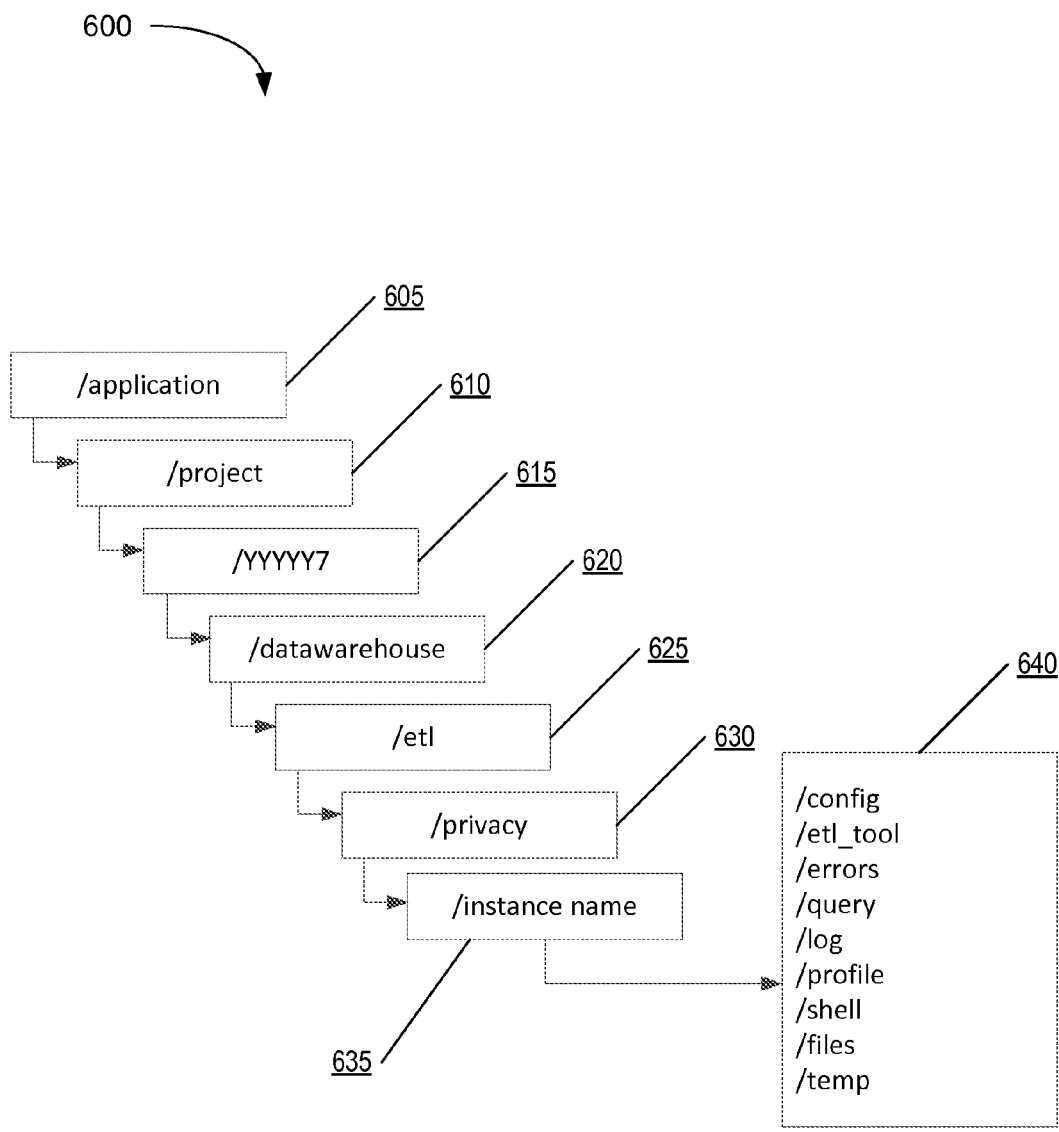
FIG. 6 illustrates an example of a directory structure for data stored in a distributed file system in which various aspects of the disclosure may be implemented.

FIG. 6 illustrates an example of a directory structure 600 for data stored in a distributed file system in which various aspects of the disclosure may be implemented. The directory structure 600 may comprise one or more parent directories, such as a /application directory 605, a /data directory (not illustrated), and a /work directory (not illustrated). The directory structure 600 may also comprise one or more sub-directories, such as /project 610. The directory structure 600 may also comprise an application initiative instance name, such as /YYYYY7 615. The directory structure 600 may comprise a line of operation, such as /datawarehouse 620, and a sub operation, such as /etl 625.

An exemplary structure for an application directory may be /app/YYYYY7/datawarehouse/et1/privacy/instance_name. Exemplary directories available inside each application is provided in the following table.

| Directory Name | Description |
| --- | --- |
| /config | Configuration files containing environment variables and system parameters may be placed in this directory |
| /etl_tool | ETL tasks and jobs may be placed in this location |
| /error | Error files written as part of ETL job may be placed in this directory |
| /query | Query related files may be present in this directory |
| /log | Log files generated by ETL jobs may be placed in this directory |
| /shell | Shell scripts to execute various ETL jobs may be placed here |

An exemplary structure for a work directory may be /work/YYYYY7/datawarehouse/et1/privacy/instance_name. Exemplary directories available inside each application is provided in the following table.

| Directory Name | Description |
| --- | --- |
| /edgenodefiles | Directory that has the file copied from edge node |
| /stagingfiles | Directory that has the intermediate files used in ETL jobs |

An exemplary structure for a data directory may be /data/YYYYY7/datawarehouse/et1/privacy/instance_name. Exemplary directories available inside each application is provided in the following table.

| Directory Name | Description |
| --- | --- |
| /private (630) | Final Load Ready and Extract files generated from ETL may be placed here |
| /public | Contains files that can be exposed to any users |
| /files | Contains X day's backup files compressed (e.g., golden copy of master extract) |

Other available directories 640 are provided in the following table.

| Directory Name | Description |
| --- | --- |
| /config | Configuration files containing environment variables and system parameters may be placed in this directory |
| /etl_tool | ETL tasks and jobs may be placed in this location |
| /errors | Error files written as part of ETL job may be placed in this directory |
| /query | Query related files may be present in this directory |
| /log | Log files generated by ETL jobs may be placed in this directory |
| /profile | Profile related files may be present in this directory |
| /shell | Shell scripts to execute various ETL jobs may be placed here |
| /files | Input files may be placed here |
| /temp | Intermediate and temporary files created during execution may be stored in this directory and deleted as per need basis after execution of the job |

Figure 7:
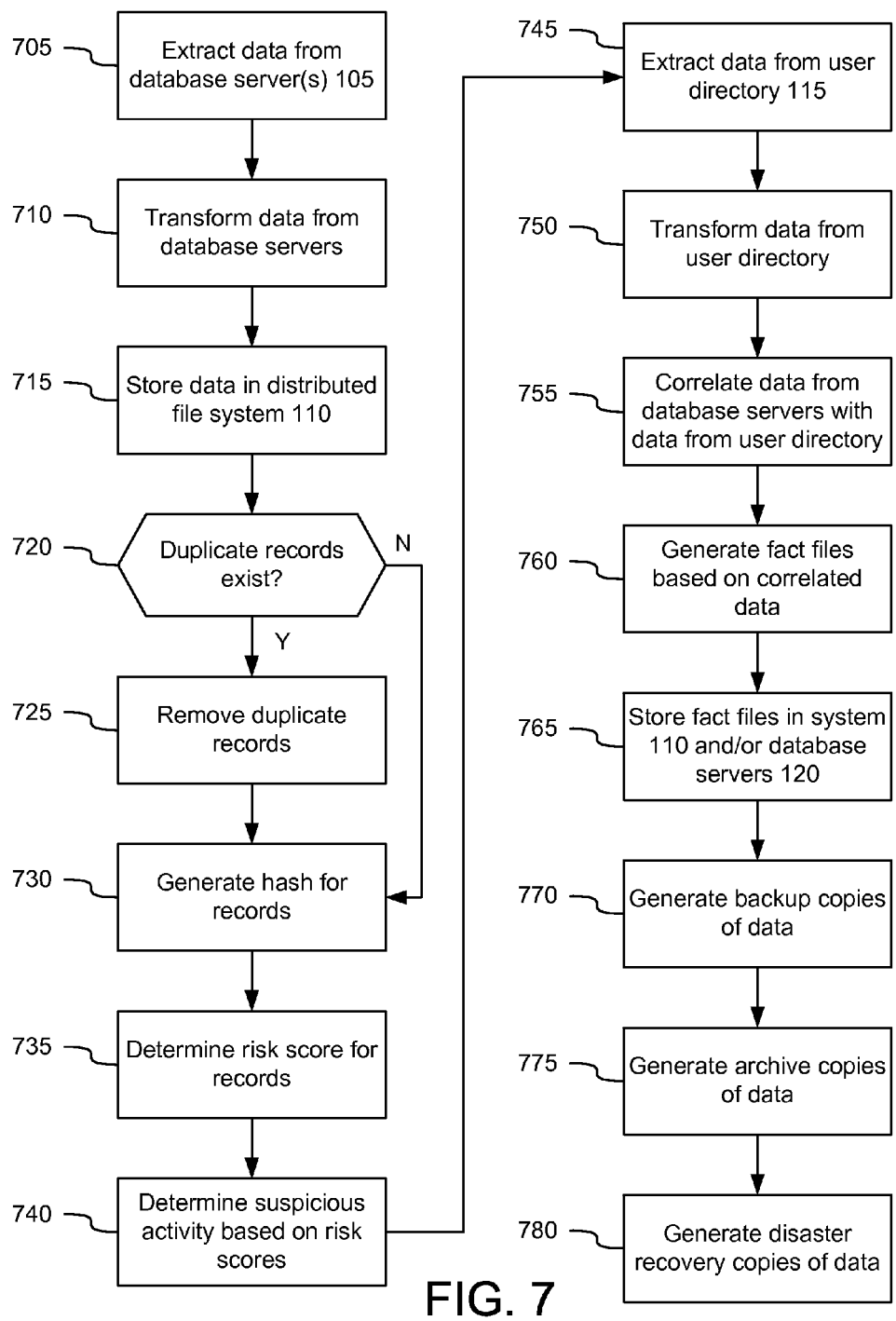
FIG. 7 illustrates an example of at least a portion of a flow diagram for monitoring and addressing data security threats in which various aspects of the disclosure may be implemented.

FIG. 7 illustrates an example of at least a portion of a flow diagram for monitoring and addressing data security threats in which various aspects of the disclosure may be implemented.

In step 705, a computing device (e.g., one or more computing device in the distributed file system 110) may extract (or otherwise receive, such as load) data from the database server(s) 105. The database server(s) may comprise a single server or multiple servers or server environments (e.g., regions), such as seven server environments. The data stored in the database servers 105 may comprise user activity data, such as which data or applications a user accessed, which data the user viewed or downloaded, which data the user uploaded, or other types of potentially suspicious activity. For example, the extracted data may comprise user access logs. Step 705 may be similar to step 245 previously described. The data extracted from the database servers 105 may comprise one or more of the data fields and values indicated in the following table:

| Column_Name | Datatype (size or length) |
| --- | --- |
| Person Number | DECIMAL(15.0) |
| Employee First Name | VARCHAR(128) |
| Employee Last Name | VARCHAR(128) |
| Associate Identifier | VARCHAR(30) |
| Application Number | DECIMAL(15.0) |
| Application Name | VARCHAR(128) |
| Social Security Number (SSN) | VARCHAR(5) |
| Pin Passwords | VARCHAR(5) |
| Credit Card Number | VARCHAR(5) |
| Debit Card Number | VARCHAR(5) |
| Mortgage Loan Numbers | VARCHAR(5) |
| Home Equity Line of Credit (HELOC) Numbers | VARCHAR(5) |
| Certificate of Deposit (CD) Numbers | VARCHAR(5) |
| Insurance Policy Numbers | VARCHAR(5) |
| Other Accounts | VARCHAR(5) |
| First Name | VARCHAR(5) |
| Last Name | VARCHAR(5) |
| AddressLine1 | VARCHAR(5) |
| AddressLine2 | VARCHAR(5) |
| City | VARCHAR(5) |
| State | VARCHAR(5) |
| Zip | VARCHAR(5) |
| Email | VARCHAR(5) |
| Phone | VARCHAR(5) |

-continued

| Column_Name | Datatype (size or length) |
| --- | --- |
| Identification | VARCHAR(5) |
| ChallengeResponseForForgottenPassword | VARCHAR(5) |
| SQL Lookup Status | VARCHAR(9) |
| Sum of Type 2 | DECIMAL(15.0) |
| Query ID | DECIMAL(18.0) |
| Environment | VARCHAR(30) |
| Calendar Date | TIMESTAMP(2) |
| Event Date Time Accessed | TIMESTAMP(2) |
| Type 1 Count | DECIMAL(15.0) |
| Query Risk Score | DECIMAL(15.0) |

In step 710, the computing device may transform the data extracted from the database server(s) 105. In some aspects, data from the servers 105 older than a predetermined age, such as 30 days, may be removed (e.g., purged). If the data is coming from multiple servers 105 (e.g., database environments), the computing device may generate a master file that combines the data in a particular indexed data storage location, such as a file. For example, the data from different regions may be concatenated to generate the master extract file. The data from the servers 705 might land uncompressed at the distributed filing system 110. After the data is extracted into a single master file, the distributed filing system 110 may generate an unaltered (e.g., golden copy) file prior to performing any other transformations. The golden copy of the data may be compressed and may be stored for a predetermined number of days, such as seven days. Generating and/or storing the golden copy may be performed at step 250, as previously described. The table below indicates exemplary data fields and values after data concatenation:

| Field Name | Field Description | Length | Type |
| --- | --- | --- | --- |
| STARTTIME | Timestamp when the query was executed on the database platform. |  | TIMESTAMP(2) |
| UTCTIMEOFFSET | Coordinated Universal Time at which the particular event occurred. | 1 | INTEGER |
| USERS | The Username used to login to the system. | 128 | VARCHAR(128) |
| MACHINENAME | The machine name used to execute the particular query. | 30 | VARCHAR(30) |
| IPADDRESS | The IPAddress of the machine from which the query was executed. | 30 | VARCHAR(30) |
| DATASOURCENAME | The platform used to execute the particular query. | 1 | CHAR(1) |
| COUNTS | The number of records fetched for the particular query. | 15 | DECIMAL(15.0) |
| LKUPRESULT | Query lookup status. | 9 | VARCHAR(9) |
| SSN_TIN_FLG | Flag used to determine if the non-public information (NPI) element SSN_TIN has been accessed. This flag will be set to True if the NPI element has been accessed else the value will be False. | 5 | VARCHAR(5) |
| PIN_PASSWORD_FLG | Flag used to determine if the NPI element PIN_Password has been accessed. This flag will be set to True if the NPI element has been accessed else the value will be False. | 5 | VARCHAR(5) |

-continued

| Field Name | Field Description | Length | Type |
|---|---|---|---|
| CREDITCARDNUMBER_FLG | Flag used to determine if the NPI element CreditCardNumber has been accessed. This flag will be set to True if the NPI element has been accessed else the value will be False. | 5 | VARCHAR(5) |
| DEBITCARDNUMBER_FLG | Flag used to determine if the NPI element DebitCardNumber has been accessed. This flag will be set to True if the NPI element has been accessed else the value will be False. | 5 | VARCHAR(5) |
| MORTGAGELOANNUMBER_FLG | Flag used to determine if the NPI element MortgageLoanNumber has been accessed. This flag will be set to True if the NPI element has been accessed else the value will be False. | 5 | VARCHAR(5) |
| HELOCNUMBER_FLG | Flag used to determine if the NPI element HELOC Number has been accessed. This flag will be set to True if the NPI element has been accessed else the value will be False. | 5 | VARCHAR(5) |
| CDNUMBER_FLG | Flag used to determine if the NPI element CDNumber has been accessed. This flag will be set to True if the NPI element has been accessed else the value will be False. | 5 | VARCHAR(5) |
| INSURANCEPOLICYNUMBER_FLG | Flag used to determine if the NPI element InsurancePolicyNumber has been accessed. This flag will be set to True if the NPI element has been accessed else the value will be False. | 5 | VARCHAR(5) |
| OTHERACCOUNTNUMBER_FLG | Flag used to determine if the NPI element OtherAccountNumber has been accessed. This flag will be set to True if the NPI element has been accessed else the value will be False. | 5 | VARCHAR(5) |
| FRSTNAME_FLG | Flag used to determine if the Personally Identifiable element FirstName has been accessed. This flag will be set to True if the Personally Identifiable element has been accessed else the value will be False. | 5 | VARCHAR(5) |
| LASTNAME_FLG | Flag used to determine if the Personally Identifiable element LastName has been accessed. This flag will be set to True if the Personally Identifiable element has been accessed else the value will be False. | 5 | VARCHAR(5) |
| ADDRESSLINE1_FLG | Flag used to determine if the Personally Identifiable element AddressLine1 has been accessed. This flag will be set to True if the Personally Identifiable element has been accessed else the value will be False. | 5 | VARCHAR(5) |
| ADDRESSLINE2_FLG | Flag used to determine if the Personally Identifiable element AddressLine2 has been accessed. This flag will be set to True if the Personally Identifiable element has been accessed else the value will be False. | 5 | VARCHAR(5) |
| CITY_FLG | Flag used to determine if the Personally Identifiable element City has been accessed. This flag will be set to True if the Personally Identifiable element has been accessed else the value will be False. | 5 | VARCHAR(5) |

-continued

| Field Name | Field Description | Length | Type |
|---|---|---|---|
| STATE_FLG | Flag used to determine if the Personally Identifiable element State has been accessed. This flag will be set to True if the Personally Identifiable element has been accessed else the value will be False. | 5 | VARCHAR(5) |
| EMAIL_FLG | Flag used to determine if the Personally Identifiable element Email has been accessed. This flag will be set to True if the Personally Identifiable element has been accessed else the value will be False. | 5 | VARCHAR(5) |
| PHONE_FLG | Flag used to determine if the Personally Identifiable element Phone has been accessed. This flag will be set to True if the Personally Identifiable element has been accessed else the value will be False. | 5 | VARCHAR(5) |
| IDENTIFICATION_FLG | Flag used to determine if the NPI element Identification has been accessed. This flag will be set to True if the NPI element has been accessed else the value will be False. | 5 | VARCHAR(5) |
| CHLNGRSPNS4FRGTNPW_FLG | Flag used to determine if the Personally Identifiable element ChallengeResponseForForgotten Password has been accessed. This flag will be set to True if the Personally Identifiable element has been accessed else the value will be False. | 5 | VARCHAR(5) |
| PROCID | Identifier of the Process used in the database system tables. | 5 | DECIMAL(5.0) |
| SESSIONID | Identifier of the database session in which a particular query was executed. | | INTEGER |
| QUERYID | Identifier of the query used in the database system tables. | 18 | DECIMAL(18.0) |
| NETWORKLOGINID | The ID of the user who has logged on to the machine. | 30 | VARCHAR(30) |
| OWNERID | The ID of the person who is responsible for the database ID. | 7 | CHAR(7) |

In some aspects, overseas data may be sent periodically, such as weekly, to the distributed file system 110. Data fields and values for overseas employees or consultants may also comprise additional or alternative information, as indicated in the following table:

| Field Name | Field Description | Length | Type |
|---|---|---|---|
| XTRCT_DT | A period end date in which data was exported from its source. For monthly extracts, the date may be the end of the month. For weekly extracts, the date may be the Friday of the week. For daily extracts, the date may be the exact date of the extract. The format is CCYY-MM-DD, i.e. 2003-04-28 for all three dates. | 10 | DATE |
| FRST_NM | The first name of the Associate | 30 | VARCHAR(30) |
| LST_NM | The last name of the Associate | 40 | VARCHAR(40) |
| MID_NM | The middle name of the Associate | 3 | CHAR(3) |
| ID | The 7 character unique id of the Associate. | 8 | CHAR(8) |
| SYS_LOGON_ID | This is the ID the individual uses to log into the system. | 90 | VARCHAR(90) |
| EML_ADDR | The email address for a client or entity. | 111 | VARCHAR(111) |
| CITY | The name of the city where the Associate is currently residing. | 40 | VARCHAR(40) |

| Field Name | Field Description | Length | Type |
|---|---|---|---|
| CNTRY | The name of the country where the Associate is currently residing. | 25 | VARCHAR(25) |
| PRTNR_NM | Name of the partner (e.g., vendor) to which the individual is employed. | 40 | VARCHAR(40) |
| MAIL_CD | The mailing address of the overseas Associate. | 13 | CHAR(13) |

In step 715, one or more computing device in the distributed filing system 110 may store the extracted and transformed data in the distributed file system 110. The data may be moved or copied to one or more edge node servers (if the edge nodes servers are separate from the distributed file system 110). In some aspects, the data may be temporarily stored until duplicates, such as duplicate activity logs and/or duplicate users, are removed, as will be described in further detail below. Data extraction, transformation, and/or loading described herein may be performed by a data extract, transform, and load (ETL) tool.

In step 720, the distributed filing system 110 may determine whether duplicate records exist. In step 725, the distributed filing system 110 may remove duplicate records if they exist. Step 725 may be similar to step 255 previously described. Duplicate records may comprise duplicate user activity for the same user. In some aspects, the distributed filing system 110 may compare the received data to other data received within a predetermined amount of time, such as within the last 4 months. Records that appear after 4 months might not be considered duplicates, even if one or more of the data fields match.

If certain data fields (e.g., in the above tables) for two records match, the system 110 may determine in step 720 that the records are duplicates and remove the duplicates in step 725. As a non-limiting example, if the user IDs match, the application names match, and the access times match, the system 110 may determine that a duplicate exists and remove one of the records. Numerous other combinations of matching data fields indicated in the tables above may be used to identify duplicate files, and those numerous combinations will not be listed here for sake of brevity. However, duplicates may generally be determined if the user, the activity, and the time of the activity match.

In step 730, the distributed filing system 110 may generate a hash for each of the non duplicative records. For example, a record hash value may be calculated for each of the remaining unique records. These hash values may be stored in a file, such as a hash file. Hash files may be generated daily. An exemplary hash file layout may comprise the following data fields and values:

| Column_Name | Datatype |
|---|---|
| HashValue | Text |

The remaining unique records within the extract may be compared with the hash file based on record hash value to identify more duplicates (e.g., if two hash values match). Duplicate records, if found, may be removed. Once duplicates have been removed once (or twice), the distributed filing system 110 may join the existing Employee IDs in the master extract to get a final list of distinct IDs.

In some embodiments, generation of the hashes in step 730 may be performed prior to determining whether duplicates exist in step 720 so that the data hashes may be used to determine duplicative records. For example, a hash may be generated for each incoming record, and a duplicative record may be determined if two of the hashes match. By generating hashes, and determining duplicate records based on the hashes, processing time and power may be reduced. In some aspects, hash files older than a predetermined age, such as 4 months, may be deleted.

In step 735, the distributed filing system 110 and/or the policy server 125 may determine a risk score associated with each record. Step 735 may be similar to step 260 previously described. In step 740, the distributed filing system 110 may determine whether there is any suspicious activity based on the determined risk score for each record. The risk score may indicate the level of the potential insider threat (e.g., low risk, medium risk, high risk, and the like). The system may calculate a risk score for a combination of, for example, non-public and/or personally identifiable data that was the content of user queries or other accesses of data from the databases 105 executed by the user. Various other factors used to determine the risk score may comprise, for example, the user's frequency of queries, how much data was returned from the query, how much sensitive data (e.g., SSNs) the user was viewing, patterns such as the number of rows that were returned in response to a query, whether certain customers were viewed, failed login attempts, work performed or work data accessed outside of normal work hours, work performed or work data accessed outside of the employer's building(s), and the like. Higher risk scores (or risk scores that exceed a threshold) may be fed to the next portion of the insider threat monitoring system and method.

Various other types of suspicious activity exist. The system may capture security events based on anomalies from users accessing data from queries executed in one or more database platforms. The system may capture and record one or more data events when a user displays, saves to file, or prints the non-public proprietary information (NPPI) data for database platforms. The system may capture and record data events when a user displays, saves to file, or prints the personally identifiable data for database platforms. The system may send alerts to the user's manager when users query any of the database platforms for sensitive information and has been identified for further approval, as will be described in further detail below. The system may monitor when users access, download or copy company confidential information. The system may identify suspected and detected violations and incidents. For example, the system may record these as a security incident when suspicious, disruptive, or policy-violating (actual or attempted) activity is detected at the application level and send notification with a requested response or approval. Anomaly thresholds may be established to constitute suspicious, disruptive or policy-violating (actual or attempted) activity.

The system may identify specific NPPI to monitor and log event records when a user queries NPPI and the data is displayed, saved to file, or printed for one or more database platforms. The system may identify specific personally identifiable data to monitor and log event records when a user queries personally identifiable and data is displayed, saved to file, or printed for one or more database platforms. The system may capture where the source and machine information is coming from in the extracted information. The system may provide total count of queries for NPPI data from the user. The system may establish risk levels associated with accessing records for NPPI data and personally identifiable data in combination. The system may provide a total count of NPPI elements that has been accessed for each query for one or more database platforms.

The system may calculate a count of NPPI elements that were accessed for each query for each user. The calculation may be performed with a total count for each identified NPPI element plus the count for identified personally identifiable data that equals greater than zero. The system may provide the user that was logged on the machine when accessing the database platform. The system may provide the logged on user person number of the standard or non-standard ID that was logged on the machine when accessing database platform sensitive data. The system may be configured to accept query logs for queries executed by overseas vendor contractors. The system may monitor query accesses by associates after termination from the company.

In step 745, a computing device (e.g., one or more computing device in the distributed file system 110) may extract data from the user directory 115. Step 745 may be similar to step 245 previously described. The extracted data may indicate user (e.g., employee) relationships based on, for example, user IDs. For example, the data may comprise a corporate directory indicating the relationship between managers and their employees. The user directory 115 data may be used to determine who to contact in the event of a security threat. For example, if a user presents a security threat or potential threat, the user's immediate manager or other manager may be contacted, as will be described in further detail below. Exemplary data from the user directory 115 is indicated in the following table:

| |
|---|
| Associate Contractor Info |
| Financial Hierarchy Info |
| Org Hierarchy Info |
| Job Code Info |
| Location Info |
| Mailcode Info |
| Job Code history Info |

In step 750, the computing device may transform (or otherwise format) the data extracted from the user directory 115. For example, the data may be cleaned to identify where the user sits in the employee hierarchy and to determine the employee's line of business and/or manager. For example, the machine name may be cleansed. If the machine name is null or N/A or the length of the machine name is 0, the machine name attribute may be replaced with another character, such as a comma (,). The machine name may be changed to upper case. If the IP address of the machine is null or N/A or the length of the IP address is 0, the IP address may be replaced by a stand in character.

Data source attributes may be cleaned. For example, the data in the tables above may be changed to upper case. The business, company, or employee attributes may be changed. If the employee division name is null, then it may be changed to N/A. Otherwise, the employee division name may be trimmed. If the employee department name is null, then it may be changed to N/A. Otherwise, the employee department name may be trimmed. If the employee department ID is null, then it may be changed to N/A. Otherwise, the employee department ID may be trimmed. If the employee business unit is null, then it may be changed to N/A. Otherwise, the employee business unit may be trimmed.

The employee dimension attributes and validation may be cleaned. If the username is null or the length is 0, then the data may be changed to N/A. Otherwise, the username may be trimmed. If the user number string is null or the length is 0, then the data may be changed to N/A. Otherwise, the user number string may be trimmed. If the employee's first name is null or the length is 0, then the data may be changed to N/A. Otherwise, the first name may be trimmed. If the employee's middle name is null or the length is 0, then the data may be changed to N/A. Otherwise, the middle name may be trimmed. If the employee's last name is null or the length is 0, then the data may be changed to N/A. Otherwise, the last name may be trimmed. If the employee number is null or the length is 0, then the data may be changed to N/A. Otherwise, the employee number may be trimmed. If the manager name is null or the length is 0, then the data may be changed to N/A. Otherwise, the manager name may be trimmed.

In step 755, the distributed filing system 110 may correlate the data extracted from the database server(s) 105 (e.g., the user access data, such as activity logs) to the data extracted from the user directory 115 (e.g., the user relationship data). For example, the recipient or recipients of the user activity information, such as a manager or managers, may be included in an aggregate data file. In step 760, the distributed filing system 110 may generate fact files based on the correlated data. Step 760 may be similar to step 270 previously described.

In step 765, the distributed filing system 110 may store the generated fact files in the distributed filing system 110 and/or in database server(s) 120. The fact files may be stored in the distributed filing system 110, such as in a directory for a given query access date. The fact file may be compressed and retained in the directory. Data compression for the fact file (and the golden copy described above) may be based on, for example, large binary compression or any other data compression technique. In some embodiments, files older than a predetermined age, such as 2 years, may be purged. The files may also be stored in one or more database server(s) 120. In some aspects, the database server(s) 120 may be the same servers as the database server(s) 105. In other aspects, the database servers 120 may comprise different servers from the database servers 105, but might use the same database storage format as the servers 105. By storing the fact files in both the distributed filing system 110 and the database servers 120, the web servers 135 may access the files from either source.

In step 770, the distributed filing system 110 may generate backup copies of the data. Within the distributed filing system architecture, multiple (e.g., 3) copies of the data may be stored automatically across data nodes. Replicating the data may be used to mitigate the risk of data loss in the event of a hardware failure on a specific data node. In the event that a failure does occur, the distributed filing system 110 may switch to a different copy without manual intervention or interruption of the process. The distributed filing system 110 may also take the data offline, mark it as bad and use one of the existing copies of the data to replicate the data to create a third copy. Operational backups may also be made of the golden copy files described herein. A maximum number of versions, such as 7 versions, of a fact file may be kept. Backup files may remain in the standard directory and might not be moved to archive directories.

In step 775, the distributed filing system 110 may generate archive copies of the data. Archive data may comprise data that has entered the inactive period of its life-cycle. For example, data that is no longer needed may be removed from the platform and stored on a separate unchangeable storage platform where files can be accessed if needed. Archives may be maintained on a disaster recovery server or a dedicated platform for distributed filing system 110 archival data. Data may be retained for a predetermined length of time, such as 2 years, and then purged. An automated purge process may be in place to write the new files, omitting those records which have expired.

In step 780, the distributed filing system 110 may generate disaster recovery copies of the data. The distributed filing system 110 may be able to recover code, the data model, and the data in the event of a disaster affecting the platform. Data to be replicated to the disaster recovery platform may be identified on the production platform and setup in the disaster recovery tool to be moved over as part of the business cycle. Applications may be enabled for disaster recovery by default. If disaster recovery is enabled, an application whose code, data, schedules and other components may be replicated to a secondary data center site. Code may be deployed to both production and disaster recovery environments. The distribution fact file and one time dimension files may be replicated to the disaster recovery environment. Employee and overseas weekly dimension might not have a disaster recovery copy because they may be refreshed daily and/or weekly. The replicated copy of application components may be operated in a secondary site in the event an application, infrastructure, or data center level issue that prevents the application from being operated in its primary data center site (until such time as the primary site is again available). Steps 770, 775, and 780 described herein may be similar to step 280 previously described.

Figure 8:
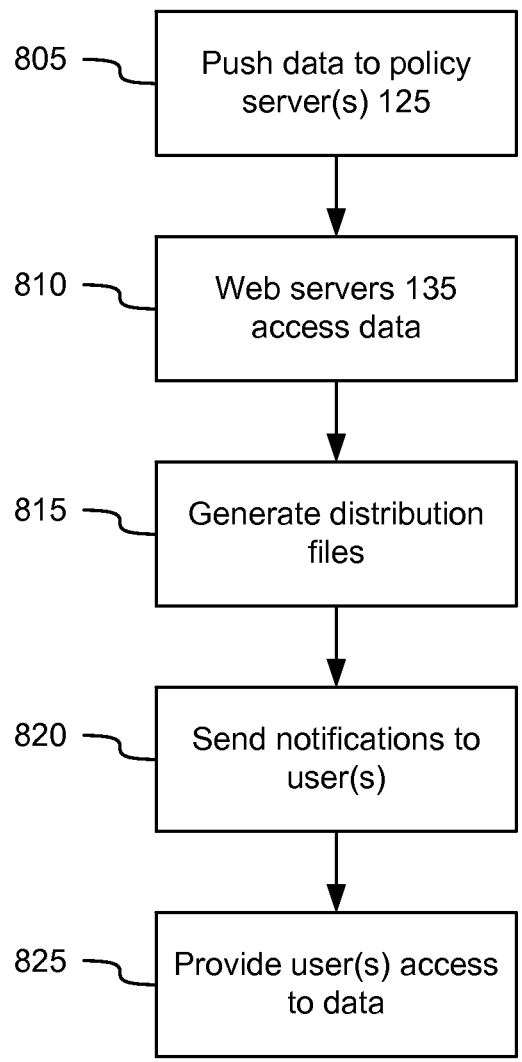
FIG. 8 illustrates another example of at least a portion of a flow diagram for monitoring and addressing data security threats in which various aspects of the disclosure may be implemented.

FIG. 8 illustrates another example of at least a portion of a flow diagram for monitoring and addressing data security threats in which various aspects of the disclosure may be implemented.

In step 805, the distributed filing system 110 may push data to one or more policy server(s) 125. Step 805 may be similar to step 265. As previously described, the policy server(s) 125 may be used to determine the risk score and/or threat level for each record. The data pushed to the policy server 125 may comprise one or more data fields and/or values indicated in the following table:

| Column_Name | Datatype(SQL Server) |
|---|---|
| EventDate | [datetime] |
| AppID | [bigint] |
| AccountID | [varchar](64) |
| PersonNumber | [varchar](16) |
| Type1Count | [bigint] |
| Type2Count | [bigint] |
| CreateDt | [datetime] |
| NPPIElementCount | [bigint] |
| NPPIRiskScore | [bigint] |
| LocalUserID | [varchar](64) |
| LoggedOnUserID | [varchar](64) |

In step 810, one or more web servers 135 may access the data from the distributed file system 110 and/or the database server(s) 120. Step 810 may be similar to step 275 previously described. Trust may also be set up between the web server 135 and the distributed file system 110 or the database server 120. For example, the web server 135 may authenticate with the distributed file system 110 or the database server 120 (or vice versa).

In step 815, the distributed file system 110 may generate distribution files so that by one or more notified users (e.g., managers) may access user activity data. Distribution files may be generated to support ad hoc, web server request, and reporting capabilities. Exemplary data fields and/or data values may comprise one or more of the data fields and values indicated in the following table:

| Column Name | Data Type |
|---|---|
| Employee Number | Text |
| Employee ID | Text |
| Employee First Name | Text |
| Employee Last Name | Text |
| Employee Middle Name | Text |
| Hire Date | Text |
| Termination Date | Text |
| Manager First Name | Text |
| Manager Last Name | Text |
| Manager ID | Text |
| Job Code | Text |
| Job Title | Text |
| Company Number | Text |
| Cost Center Name | Text |
| Cost Center Code | Text |
| Line of Business Name | Text |
| Division Name | Text |

The distribution files may comprise information from the employee's activity logs (e.g., employee identifier, data accessed, query access date, how often the data was accessed, flags, and the like) combined with data from the user directory 115 (e.g., the employee's manager's ID, name, and the like).

In step 820, the web server 135 may send notifications to one or more user(s), such as the employee's manager(s) or a group associated with the employee or manager. The recipients may be identified in the user directory 115 and included in the distribution file(s), as previously described. The notification may comprise an electronic notification, such as an email, an automated telephone call, a message in a security threat application, and the like. The notification may indicate various details regarding, for example, the number of records received and processed. Exemplary data fields and values included in the notification are indicated in the following table:

| Field | Description |
|---|---|
| Date | Date on which the master extract landed on the edge node. |
| Received records | Number of records in the master extract (including duplicates). |
| Aggregated records sent to policy server | Number of records loaded into the policy server load file. |
| Records loaded to the fact file | Number of records loaded into the application fact file for a particular date. |
| Records with warnings | Number of records in the master extract (after removing duplicates) having STARTTIME older than CURRENT_DATE-X (e.g., CURRENT_DATE-3) |

In some aspects, the system may provide a notification that calculates the total count of queries with a value greater than a predetermined number of sensitive information accessed, such as 300 SSNs. The notification may include column totals. The notification may be sorted by date. The notification may include an option to select a data range. The notification may display a graph (or other graphical display) for the information on the notification. The notification may indicate the total number of queries and/or the SSN records accessed by date and/or employee ID. The notification may be sorted by count of SSN Records in descending order. The notification may include an option to click on a query ID to retrieve the actual SQL for the query. The notification may sum up the SSN records for each job title. The notification may be sortable by the count of queries in descending order. The notification may be grouped by job title and/or subtotaled for each job title.

The notification may display the risk score, weights used to determine the risk score, and/or a legend for the risk weight score. The notification may include a count of queries run by each employee, by date and display the information in tabular form and/or a trend graph. The notification may display the composition (e.g., complete composition) of the queries being run by users working on one or more applications and/or devices. The notification may show the sum of records returned by any given query ID, whether the query is considered to be dangerous, and which data elements where returned. The notification may be designed to allow the user of the report to add additional user IDs to the notification at run-time. The notification may display large volume of NPPI consumption by a particular user ID at run-time (e.g., greater than a threshold). The notification may provide an option to receive inputs, such as date and the associate ID, to query the system to display the SQLs issued to the application by the associate.

The notification may include a count of the number of queries that were run against the application, that returned more than 300 credit card numbers (CCNs), and the total number of CCN records selected from the application by date and subtotaled across the date range selected. For example, the notification may be sorted in descending order by the count of CCN Records and display the total per line. The notification may comprise the option to select an event date time accessed. The notification may show a count of query ID and the sum of the SSN and/or CCN records accessed by associates from an application or device. The notification may be arranged by group (e.g., employee group) and/or subtotaled at each group. The notification may include total CCN Records per line and display a graph of the same data. The notification may show the count of queries and the sum of records returned from the system by line of business. For example, the notification may include a total count of queries and sum of records returned per line and/or display a graph of the same data.

The notification may show the count of queries and the sum of records returned from the system by overseas consultants. The notification may show the count of queries and the sum of records returned from system. The notification may show the records consumed by the application by event date for the last 30 days (or other date range). For example, the notification may include the option to select event date time accessed for the previous 30 days and/or a trend analysis graph depicting data as well as report the format. The notification may show the count of queries and sum of records consumed by day, by environment. The user may be able to choose any column (SSN, CCN, Loan Number, Debit Card number, and the like) to display its distribution.

In some aspects, some of the data associated with the user and user activity may be displayed in the notification sent to the manager(s). The notification may also include a link, such as a URL or other pointer, to additional data, such as data associated with the number of records received and/or processed. The recipient of the notification may select the link to access the additional information, such as after the recipient has authenticated with the monitoring system.

In step 825, the web server 135, the distributed filing system 110, and/or the database server(s) 120 may provide user(s) (e.g., managers or other recipients of notifications) access to the data (e.g., to one or more reports). As explained above, the email sent to a manager may include a link that allows the manager to access the data stored in either the database server(s) 120 or the distributed file system 110. For example, the user may access the data through a web request. Moreover, the system may support ad hoc queries or other searches of records and/or canned reporting. In some aspects, the notifications and/or reports might not contain any non-public proprietary information (NPPI) data. Instead, they may contain flags as to NPPI fields used by a query/user (but not the actual data).

Various exemplary notifications and/or reports containing one or more of the data fields and values described above will now be illustrated in the following tables.

| FIELDS |
|---|
| Calendar Date |
| Environment |
| Count of Query |
| Sum of SSN Records |

| FIELDS |
|---|
| Associate Person Number |
| Associate ID |
| Environment |
| Count of Query ID |
| Sum of SSN Records |

| FIELDS |
|---|
| Associate Person Number |
| Associate ID |
| Employee First Name |
| Employee Last Name |
| Job Title |
| Environment |
| Sum of SSN Records |
| Total |

| FIELDS |
|---|
| Job Title |
| Associate Person Number |
| Associate ID |
| Environment |
| Query ID |
| Sum of SSN Records |
| Risk Weighting |
| Query Risk Score |

| FIELDS |
|---|
| Associate Person Number |
| Associate ID |
| Employee First Name |
| Employee Last Name |
| Calendar Date |
| Environment |
| Query ID |
| Sum of SSN Records |
| Total |

| FIELDS |
|---|
| Associate Person Number |
| Associate ID |
| Employee First Name |
| Employee Last Name |

-continued

Job title
Environment
Count of Query ID
Total

FIELDS

Job Title
Associate Person Number
Associate ID
Environment
Count of Query ID
Total

FIELDS

Job Title
Associate Person Number
Associate ID
Environment
Count of Query ID
Total

FIELDS

Associate ID
Calendar Date
SSN
Password
Credit Card #
Debit Card
Loan Number
HELOC
CD Number
Insurance Policy
Other Accounts: Bank/Check
First Name
Last Name
Address 1
Address2
City
State
Zip
Email Address
Phone
Identification
Total
Grand Total

FIELDS

Associate ID
Environment
Grand Total

FIELDS

Associate ID
Environment
Selected Day
Grand Total

FIELDS

Associate ID
Environment
Selected Day
Grand Total

FIELDS

Associate ID
Calendar Date
SSN
Password
Credit Card #
Debit Card
Loan Number
HELOC -continued CD Number
Insurance Policy
Other Accounts: Bank/Check
First Name
Last Name
Address 1
Address2
City
State
Zip
Email Address
Phone
Identification
Total
Grand Total

FIELDS

Employee First Name
Employee Last Name
Associate ID
Event Date Time Accessed
Employee Manager Name
Process ID/Database Node ID
Database Session ID
Environment
Database Query ID
Count of Records returned to the Buffer
Risk Weighting
Query Risk Score

FIELDS

Start Time
Log Date
Client ID
Proc ID
Session ID
Number Result Rows
SQL Test Info

FIELDS

Calendar Date
Environment
Count of Query
Sum of CCN Records

FIELDS

Hierarchy Code
Hierarchy Desc
Job title
Associate Person Number
Associate ID
Employee First Name
Employee Last Name
Contains SSN
Contains CCN

FIELDS

Hierarchy Code
Hierarchy Desc
Count of Query
Sum of Records Returned
Grand Total

FIELDS

Vendor Name
Country
ID
Sys Log On ID
First Name
Last Name
Email Address
Job Title
HR Job Code -continued Termination Date
Employee Manager Name
Hierarchy Code

FIELDS

ID
First Name
Middle Name
Last Name
Person Number
Job Title
Job Code
Debit Card Numbers
Mortgage Loan Number
HELOC Numbers
CD Numbers
Insurance Policy Numbers
Other Accounts
Count of Queries
Count of Records Consumed FIG. 9 illustrates an example of a notification 900 for addressing data security threats in which various aspects of the disclosure may be implemented. As previously explained, the notification may comprise an electronic notification, such as an email. The notification 900 may indicate 905 the sender (e.g., Security Group) and/or recipient (e.g., Manager 1 and Manager 2) of the notification 900. The notification 900 may also indicate 910 one or more pieces of information identifying the security event, such as a verification letter identifying the recipients (e.g., manager 1 and manager 2), the user involved in the data security event (e.g., user ZZZ1), and the date of the security event (e.g., DD-MM-YYYY HH:MM:SS UTC). The notification 900 may include a message to the recipients, such as "Security Group has detected <First Name> <Last Name> accessing Confidential or Proprietary information within the <Application> environment. The <Application> environment is an enterprise data warehouse containing customer-centric data, including sensitive customer information, that can be accessed by approved users to support business analytics. Unauthorized access violates Security Policy." The notification 900 may also include a link 915. When selected, the link 915 may direct the recipient of the notification 900 to additional details on the security event, such as one or more query reports. Query reports were described above and will be described in further detail below with reference to FIG. 10.

The notification 900 may also indicate 925 actions that the recipient of the notification 900 may take. For example, the notification 900 may include a message to the recipient requesting action, such as "For associates who are out of the office and unable to respond, please click here to provide a return date. Note: Access will be suppressed in the interim. A reminder alert will be generated upon the return date." Additionally or alternatively, the notification 900 may indicate 930 actions that the recipient can take, such as to confirm the user is performing a normal, authorized business activity for an open ended amount of time, confirm the user is performing a temporary, authorized business activity that will be discontinued at a future date, or confirm the user does not require access to the <Application> and revoke the access.

FIG. 10 illustrates examples of reports 1005, 1010, and 1015 for addressing data security threats in which various aspects of the disclosure may be implemented. In some aspects, one or more of the data fields and values illustrated in the reports 1005, 1010, and/or 1015 may be displayed on the recipient's display device (e.g., a workstation) in response to the recipient requesting additional details on the security event included in a notification, such as by selecting the link 915 described above with respect to FIG. 9. The various data fields illustrated in FIG. 10 were previously described, and their description will not be repeated here.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
monitoring user device activity for one or more data security events;
based on a determination that the user device activity being monitored satisfies one or more data security event triggers, receiving, at a distributed file device and from a database server, a plurality of data indicating user device activity, wherein the plurality of data includes user identifiers identifying users associated with the user device activity being monitored;
generating a hash for each of the plurality of data indicating user device activity;
based on a comparison of the hash generated for each of the plurality of data indicating user device activity, determining whether duplicates of the plurality of data indicating user device activity exist;
based on determining that a time difference between a first activity time associated with first data indicating user device activity and a second activity time associated with second data indicating user device activity is less than a threshold time difference, determining that the second data indicating user device activity is a duplicate of the first data indicating user device activity;

based on a determination that one or more duplicates of the plurality of data indicating user device activity exist, deleting the one or more duplicates of the plurality of data, wherein the deleting the one or more duplicates comprises deleting the second data indicating user device activity;

based on the deleting the one or more duplicates of the plurality of data, generating, from a remainder of the plurality of data indicating user device activity, a unique plurality of data indicating user device activity;

receiving, at the distributed file device and from a user directory, a plurality of data indicating relationships between the users associated with the user device activity being monitored;

generating, by the distributed file device, a plurality of correlated data files based on the unique plurality of data indicating user device activity and the received plurality of data indicating relationships between the users, wherein the plurality of correlated data files comprises a first data file that correlates a first user identifier with user device activity of a second user;

determining a data security score for the first data file; and in response to determining that the data security score for the first data file exceeds a threshold score, transmitting at least one of the first data file or an electronic notification of the first data file to a web server, wherein the web server is configured to provide access to the first data file to a first user having the first user identifier.

2. The method of claim 1, wherein the comparison of the hash generated for each of the plurality of data indicating user device activity comprises a determination of whether a hash value of the hash for each of the plurality of data indicating user device activity matches another hash value of another hash.

3. The method of claim 1, wherein the plurality of data indicating user device activity comprises third data indicating user device activity having a third user identifier, a third activity identifier, and a third time of activity and fourth data indicating user device activity having a fourth user identifier, a fourth activity identifier, and a fourth time of activity, the method further comprising:

responsive to a determination that the third user identifier matches the fourth user identifier, the third activity identifier matches the fourth activity identifier, and the third time of activity matches the fourth time of activity, determining that the fourth data indicating user device activity is a duplicate of the third data indicating user device activity; and responsive to the determining that the fourth data indicating user device activity is a duplicate of the third data indicating user device activity, deleting the fourth data indicating user device activity.

4. The method of claim 1, wherein the plurality of data indicating user device activity comprises third data indicating user device activity and fourth data indicating user device activity, the method further comprising:

generating a hash for the third data indicating user device activity to generate hashed third data;

generating a hash for the fourth data indicating user device activity to generate hashed fourth data;

responsive to a determination that the hashed third data matches the hashed fourth data, determining that the fourth data indicating user device activity is a duplicate of the third data indicating user device activity; and responsive to the determining that the fourth data indicating user device activity is a duplicate of the third data indicating user device activity, deleting the fourth data indicating user device activity.

5. The method of claim 1, wherein the plurality of data indicating user device activity comprise user logs indicating access to one or more of non-public proprietary information data, personally identifiable data, or confidential information.

6. The method of claim 1, further comprising performing one or more of the following:

providing, by the distributed file device, the web server with access to the first data file; and transmitting, by the distributed file device, the first data file to the database server, wherein the database server is configured to provide the web server with access to the first data file.

7. The method of claim 1, further comprising:

transmitting, by the distributed file device, the first data file to a policy server, wherein the policy server is configured to determine the data security score for the first data file in response to receiving the first data file.

8. The method of claim 1, wherein the receiving the plurality of data indicating user device activity comprises receiving, at the distributed file device, from a plurality of database servers, and at predetermined time intervals determined based on a geographical location of each of the plurality of database servers, the plurality of data indicating user device activity, the method further comprising:

determining a subset of the plurality of data indicating user device activity, wherein the subset comprises data that is older than a predetermined threshold;

deleting the subset of the plurality of data;

based on the deleting the subset of the plurality of data, generating a master file comprising a remainder of the plurality of data indicating user device activity.

9. A distributed file device, comprising:

a processor; and memory storing computer-executable instructions that, when executed by the processor, cause the distributed file device to:

monitor user device activity for one or more data security events;

based on a determination that the user device activity being monitored satisfies one or more data security event triggers, receive, from a database server, a plurality of data indicating user device activity, wherein the plurality of data includes user identifiers identifying users associated with the user device activity being monitored;

generate a hash for each of the plurality of data indicating user device activity;

based on a comparison of the hash generated for each of the plurality of data indicating user device activity, determine whether duplicates of the plurality of data indicating user device activity exist;

based on a determination that a time difference between a first activity time associated with first data indicating user device activity and a second activity time associated with second data indicating user device activity is less than a threshold time difference, determine that the second data indicating user device activity is a duplicate of the first data indicating user device activity;

based on a determination that one or more duplicates of the plurality of data indicating user device activity exist, delete the one or more duplicates of the plurality of data, wherein the deleting the one or more duplicates comprises deleting the second data indicating user device activity;

based on the deleting the one or more duplicates of the plurality of data, generate, from a remainder of the plurality of data indicating user device activity, a unique plurality of data indicating user device activity;

receive, from a user directory, a plurality of data indicating relationships between the users associated with the user device activity being monitored;

generate a plurality of correlated data files based on the unique plurality of data indicating user device activity and the received plurality of data indicating relationships between the users, wherein the plurality of correlated data files comprises a first data file that correlates a first user identifier with user device activity of a second user;

determine a data security score for the first data file; and in response to determining that the data security score for the first data file exceeds a threshold score, transmit at least one of the first data file or an electronic notification of the first data file to a web server, wherein the web server is configured to provide access to the first data file to a first user having the first user identifier.

10. The distributed file device of claim 9, wherein the comparison of the hash for each of the plurality of data indicating user device activity comprises a determination of whether a hash value of the hash for each of the plurality of data indicating user device activity matches another hash value of another hash.

11. The distributed file device of claim 9, wherein the plurality of data indicating user device activity comprises third data indicating user device activity having a third user identifier, a third activity identifier, and a third time of activity and fourth data indicating user device activity having a fourth user identifier, a fourth activity identifier, and a fourth time of activity, and wherein the memory stores additional computer-executable instructions that, when executed by the processor, cause the distributed file device to:

responsive to a determination that the third user identifier matches the fourth user identifier, the third activity identifier matches the fourth activity identifier, and the third time of activity matches the fourth time of activity, determine that the fourth data indicating user device activity is a duplicate of the third data indicating user device activity; and responsive to the determining that the fourth data indicating user device activity is a duplicate of the third data indicating user device activity, delete the fourth data indicating user device activity.

12. The distributed file device of claim 9, wherein the plurality of data indicating user device activity comprises third data indicating user device activity and fourth data indicating user device activity, and wherein the memory stores additional computer-executable instructions that, when executed by the processor, cause the distributed file device to:

generate a hash for the third data indicating user device activity to generate hashed third data;

generate a hash for the fourth data indicating user device activity to generate hashed fourth data;

responsive to a determination that the hashed third data matches the hashed fourth data, determine that the fourth data indicating user device activity is a duplicate of the third data indicating user device activity; and responsive to the determining that the fourth data indicating user device activity is a duplicate of the third data indicating user device activity, delete the fourth data indicating user device activity.

13. The distributed file device of claim 9, wherein the plurality of data indicating user device activity comprise user logs indicating access to one or more of non-public proprietary information data, personally identifiable data, or confidential information.

14. The distributed file device of claim 9, wherein the memory stores additional computer-executable instructions that, when executed by the processor, cause the distributed file device to perform one or more of the following:

provide the web server with access to the first data file; and transmit the first data file to the database server, wherein the database server is configured to provide the web server with access to the first data file.

15. The distributed file device of claim 9, wherein the memory stores additional computer-executable instructions that, when executed by the processor, cause the distributed file device to:

transmit the first data file to a policy server, wherein the policy server is configured to determine the data security score for the first data file in response to receiving the first data file.

16. One or more non-transitory computer-readable media storing computer-readable instructions that, when executed by a distributed file device, cause the distributed file device to:

monitor user device activity for one or more data security events;

based on a determination that the user device activity being monitored satisfies one or more data security event triggers, receive, from a database server, a plurality of data indicating user device activity, wherein the plurality of data includes user identifiers identifying users associated with the user device activity being monitored;

generate a hash for each of the plurality of data indicating user device activity;

based on a comparison of the hash generated for each of the plurality of data indicating user device activity, determine whether duplicates of the plurality of data indicating user device activity exist;

based on a determination that a time difference between a first activity time associated with first data indicating user device activity and a second activity time associated with second data indicating user device activity is less than a threshold time difference, determine that the second data indicating user device activity is a duplicate of the first data indicating user device activity;

based on a determination that one or more duplicates of the plurality of data indicating user device activity exist, delete the one or more duplicates of the plurality of data, wherein deleting the one or more duplicates comprises deleting the second data indicating user device activity;

based on the deleting the one or more duplicates of the plurality of data, generate, from a remainder of the plurality of data indicating user device activity, a unique plurality of data indicating user device activity;

receive, from a user directory, a plurality of data indicating relationships between the users associated with the user device activity being monitored;

generate a plurality of correlated data files based on the unique plurality of data indicating user device activity and the received plurality of data indicating relationships between the users, wherein the plurality of correlated data files comprises a first data file that correlates a first user identifier with user device activity of a second user;

determine a data security score for the first data file; and in response to determining that the data security score for the first data file exceeds a threshold score, transmit at least one of the first data file or an electronic notification of the first data file to a web server, wherein the web server is configured to provide access to the first data file to a first user having the first user identifier.

17. The one or more non-transitory computer-readable media of claim 16, wherein the comparison of the hash generated for each of the plurality of data indicating user device activity comprises a determination of whether a hash value of the hash generated for each of the plurality of data indicating user device activity matches another hash value of another hash.

18. The one or more non-transitory computer-readable media of claim 16, wherein the plurality of data indicating user device activity comprises third data indicating user device activity having a third user identifier, a third activity identifier, and a third time of activity and fourth data indicating user device activity having a fourth user identifier, a fourth activity identifier, and a fourth time of activity, and wherein the one or more non-transitory computer-readable media stores computer-readable instructions that, when executed by the distributed file device, cause the distributed file device to:

responsive to a determination that the third user identifier matches the fourth user identifier, the third activity identifier matches the fourth activity identifier, and the third time of activity matches the fourth time of activity, determine that the fourth data indicating user device activity is a duplicate of the third data indicating user device activity; and responsive to the determining that the fourth data indicating user device activity is a duplicate of the third data indicating user device activity, delete the fourth data indicating user device activity.

19. The one or more non-transitory computer-readable media of claim 16, wherein the plurality of data indicating user device activity comprises third data indicating user device activity and fourth data indicating user device activity, and wherein the one or more non-transitory computer-readable media stores computer-readable instructions that, when executed by the distributed file device, cause the distributed file device to:

generate a hash for the third data indicating user device activity to generate hashed third data;

generate a hash for the fourth data indicating user device activity to generate hashed fourth data;

responsive to a determination that the hashed third data matches the hashed fourth data, determine that the fourth data indicating user device activity is a duplicate of the third data indicating user device activity; and responsive to the determining that the fourth data indicating user device activity is a duplicate of the third data indicating user device activity, delete the fourth data indicating user device activity.

20. The one or more non-transitory computer-readable media of claim 16, wherein the plurality of data indicating user device activity comprise user logs indicating access to one or more of non-public proprietary information data, personally identifiable data, or confidential information.

* * * * *